United States Patent
Ichikawa

(10) Patent No.: US 9,973,042 B2
(45) Date of Patent: May 15, 2018

(54) POWER TRANSMISSION SYSTEM

(71) Applicant: Murata Manufacturing Co., Ltd., Nagaokakyo-shi, Kyoto-fu (JP)

(72) Inventor: Keiichi Ichikawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 215 days.

(21) Appl. No.: 15/155,414

(22) Filed: May 16, 2016

(65) Prior Publication Data
US 2016/0315504 A1 Oct. 27, 2016

Related U.S. Application Data

(63) Continuation of application No. PCT/JP2015/051476, filed on Jan. 21, 2015.

(30) Foreign Application Priority Data

Feb. 7, 2014 (JP) .................................. 2014-022458

(51) Int. Cl.
*H02J 50/05* (2016.01)
*H02J 50/12* (2016.01)
(Continued)

(52) U.S. Cl.
CPC ............. *H02J 50/12* (2016.02); *H02J 7/025* (2013.01); *H02J 50/05* (2016.02); *H02J 7/345* (2013.01)

(58) Field of Classification Search
CPC ............................... H02J 50/05; H04B 5/0012
(Continued)

(56) References Cited

U.S. PATENT DOCUMENTS 5,874,921 A * 2/1999 Doherty ................. H01Q 1/242
343/702
6,611,199 B1 * 8/2003 Geiszler ............... G06K 7/0008
340/10.51
(Continued)

FOREIGN PATENT DOCUMENTS

JP 2013230079 A 11/2013
WO WO 2013/054800 A1 3/2015
WO WO 2013073608 A1 4/2015

OTHER PUBLICATIONS

International Search Report for PCT/JP2015/051476 dated Mar. 3, 2015.
Written Opinion for PCT/JP2015/051476 dated Mar. 3, 2015.

*Primary Examiner* — Daniel Kessie
(74) *Attorney, Agent, or Firm* — Arent Fox LLP

(57) ABSTRACT

In a power transmitting device (101) and a power receiving device (201), active electrodes (13, 23), passive electrodes (14, 24), and reference potential electrodes (15, 25) oppose each other so as to make capacitance coupling, so that capacitances Caa, Cpp, and Cgg are generated. Capacitors having capacitances $C1a$, $C1p$, $C2a$, and $C2p$ are connected to between the reference potential electrode (15) and the active electrode (13), between the reference potential electrode (15) and the passive electrode (14), between the reference potential electrode (25) and the active electrode (23), and between the reference potential electrode (25) and the passive electrode (24), respectively. The power transmission system (1) satisfies any one or more of the conditions of Caa+Cpp<Cgg, $C1a+C1p$<Cgg, and $C2a+C2p$<Cgg. With this, the power transmission system stabilizing a reference potential of the power receiving device is provided.

12 Claims, 9 Drawing Sheets

(51) Int. Cl.
*H02J 7/02* (2016.01)
*H02J 7/34* (2006.01)

(58) Field of Classification Search
USPC .................................................. 307/104, 109
See application file for complete search history.

(56) References Cited

U.S. PATENT DOCUMENTS

| | | | | |
|---|---|---|---|---|
| 7,613,273 | B2* | 11/2009 | Beyerlein | A61B 6/56 |
| | | | | 361/143 |
| 8,907,526 | B2* | 12/2014 | Harakawa | H02J 5/005 |
| | | | | 307/104 |
| 9,741,487 | B2* | 8/2017 | Waffenschmidt | H02J 7/025 |
| 9,748,801 | B2* | 8/2017 | Sempel | H02J 5/00 |
| 2011/0029721 | A1* | 2/2011 | Yu | G06F 21/79 |
| | | | | 711/103 |
| 2013/0002048 | A1* | 1/2013 | Ichikawa | H02M 5/10 |
| | | | | 307/149 |
| 2013/0162203 | A1* | 6/2013 | Kamata | H02J 7/025 |
| | | | | 320/108 |
| 2013/0249309 | A1 | 9/2013 | Miwa et al. | |
| 2014/0175907 | A1 | 6/2014 | Takahashi et al. | |
| 2014/0191818 | A1* | 7/2014 | Waffenschmidt | H02J 7/025 |
| | | | | 333/17.1 |
| 2014/0300201 | A1 | 10/2014 | Ichikawa et al. | |
| 2016/0164307 | A1* | 6/2016 | Shibata | H02J 50/05 |
| | | | | 307/104 |

* cited by examiner

POWER TRANSMISSION SYSTEM

CROSS REFERENCE

The present application is a continuation of International application No. PCT/JP2015/051476, filed Jan. 21, 2015, which claims priority to Japanese Patent Application No. 2014-022458, filed Feb. 7, 2014, the entire contents of each of which are incorporated herein by reference.

TECHNICAL FIELD

The present invention relates to a power transmission system that transmits electric power to a power receiving device from a power transmitting device wirelessly.

BACKGROUND ART

There is a system using an electric field coupling method as a power transmission system. The power transmission system transmits electric power to a power receiving device from a power transmitting device when active electrodes of the power transmitting device and the power receiving device oppose each other and a strong electric field is formed between the two electrodes to establish electric field coupling between the electrodes.

International Publication No. 2013/054800 pamphlet discloses a power transmission system using the electric field coupling method. The power transmission system as disclosed in International Publication No. 2013/054800 pamphlet stabilizes a reference potential of a power receiving device in power transmission to the power receiving device from a power transmitting device and causes no malfunction in the power receiving device. In the power transmission system, both the power transmitting device and the power receiving device include a reference potential electrode connected to a reference potential. The reference potential electrodes are made to oppose each other when power is transmitted to the power receiving device from the power transmitting device so as to stabilize the reference potential of the power receiving device and stabilize operations of the power receiving device.

SUMMARY OF INVENTION

However, the power transmission system as disclosed in International Publication No. 2013/054800 pamphlet does not disclose conditions related to the reference potential electrodes, such as their size. The reference potential of the power receiving device cannot be stabilized in some cases only by providing the reference potential electrodes in the power receiving device and the power transmitting device simply and making them oppose each other. When the reference potential of the power receiving device is not stable, there is a risk that malfunction occurs in the power receiving device.

An object of the present invention is to provide a power transmission system stabilizing a reference potential of a power receiving device.

In accordance with a first preferred embodiment of the invention, the power transmission system comprises:
 (a) a power transmitting device including:
  (i) transmitting side first and second electrodes which receive an alternating current voltage;
  (ii) a transmitting side reference electrode connected to a first reference potential;
  (iii) a transmitting side first capacitor having a capacitance $C1a$ connected between the transmitting side reference electrode and the transmitting side first electrode; and
  (iv) a transmitting side second capacitor having a capacitance $C1p$ connected between the transmitting side reference electrode and the transmitting side second electrode; and
 (b) a power receiving device including:
  (i) a receiving side first and second electrodes;
  (ii) a receiving side reference electrode connected to a second reference potential;
  (iii) a receiving side first capacitor having a capacitance $C2a$ connected between the receiving side reference electrode and the receiving side first electrode; and
  (iv) a receiving side second capacitor having a capacitance $C2p$ connected between the receiving side reference electrode and the receiving side second electrode; and
 when the power transmitting device is placed in operative engagement with the power receiving device such that (i) the transmitting side first electrode opposes the receiving side first electrode with a gap there between to form a capacitor having a capacitance $Caa$, (ii) the transmitting side second electrode opposes the receiving side second electrode with a gap there between to form a capacitor having a capacitance $Cpp$; and (iii) the transmitting side reference electrode opposes the receiving side reference electrode with a gap to form a capacitor having a capacitance $Cgg$, at least one of the following relationships is met: $Caa+Cpp<Cgg$, $C1a+C1p<Cgg$, and $C2a+C2p<Cgg$.

In this embodiment, means, such as a step up transformer, are preferably provided for applying the alternating current to the transmitting side first and second electrodes.

In a preferred aspect of this embodiment, the conditions $C1a+C1p<Cgg$ or $C2a+C2p<Cgg$ is satisfied. In a more preferred embodiment, the condition of $C1a+C1p<Cgg$ is satisfied.

In a further preferred aspect of the invention, the power transmitting device and the power receiving device include respective metallic cases which form at least part of the transmitting and receiving side reference electrodes, respectively. In a further preferred aspect, the power transmitting device comprises a housing including the transmitting side reference electrode and the power receiving device comprises a housing including the receiving side reference electrode and the transmitting side and receiving side reference electrodes are bent in a complimentary way such that the transmitting side reference electrode can nest into the receiving side reference electrode.

In further preferred aspects, surface areas of the opposing transmitting and receiving side reference electrodes are greater than surface areas of the opposing transmitting side first electrode and the receiving side first electrode and surface areas of the opposing transmitting side second electrode and the receiving side second electrode.

In yet a further preferred aspect, the gap between the opposing transmitting side first electrode and the receiving side first electrode and the gap between the opposing transmitting side second electrode and the receiving side second electrode is larger than the gap between the opposing transmitting and receiving side reference electrodes.

In yet another preferred aspect of this embodiment the gap between the opposing transmitting side first electrode and the receiving side first electrode and the gap between the opposing transmitting side second electrode and the receiving side second electrode is filled with air and the gap between the opposing transmitting and receiving side reference electrodes is filled with resin.

In a second preferred embodiment of the invention, the power transmission system comprises:

(a) a power transmitting device including:

(i) a transmitting side coil which receives an alternating current voltage;

(ii) a transmitting side reference electrode connected to a first reference potential;

(iii) a transmitting side first capacitor having a capacitance $C1a$ connected between the transmitting side reference electrode and a first terminal of the transmitting side coil; and (iv) a transmitting side second capacitor having a capacitance $C1p$ connected between the transmitting side reference electrode and a second terminal of the transmitting side coil; and (b) a power receiving device including:

(i) a receiving side coil;

(ii) a receiving side reference electrode connected to a second reference potential;

(iii) a receiving side first capacitor having a capacitance $C2a$ connected between the receiving side reference electrode and a first terminal of the receiving side coil; and (iv) a receiving side second capacitor having a capacitance $C2p$ connected between the receiving side reference electrode and a second terminal of the receiving side coil; and when the power transmitting device is placed in operative engagement with the power receiving device such that (i) the transmitting side coil faces the receiving side coil with a gap there between to form a capacitor having a capacitance Caa and transmits a voltage induced by a magnetic field coupling to the receiving side coil (ii) the power transmitting side second electrode opposes the receiving side second electrode with a gap there between to form a capacitor having a capacitance Cpp; and (iii) the transmitting-side reference electrode opposes the receiving side reference electrode with a gap to form a capacitor having a capacitance Cgg, at least one of the following relationships is met: $Caa+Cpp<Cgg$, $C1a+C1p<Cgg$, and $C2a+C2p<Cgg$.

Like the above embodiments, this embodiment preferably includes means, such as a step up transformer, are preferably provided for applying the alternating current to the transmitting side first and second electrodes.

In a preferred version of this embodiment, the conditions $C1a+C1p<Cgg$ or $C2a+C2p<Cgg$ is satisfied. In a more preferred embodiment, the condition of $C1a+C1p<Cgg$ is satisfied.

With these configurations, the reference potential of the power receiving device is connected to the reference potential of the power transmitting device with the capacitor formed by the transmitting-side reference electrode and the receiving-side reference electrode interposed there between. When the capacitance Cgg of the capacitor satisfies a predetermined condition, the reference potential at the power receiving device side can be made close to the reference potential at the power transmitting device side. With this, the reference potential of the power receiving device can be stabilized.

Advantageous Effects of Invention

According to the present invention, the reference potential at the power receiving device side can be made close to the reference potential at the power transmitting device side, thereby stabilizing the reference potential of the power receiving device.

BRIEF DESCRIPTION OF DRAWINGS

FIG. 2(A) illustrates a circuit when the reference potential electrodes are not provided and FIG. 2(B) illustrates a circuit when the reference potential electrodes are provided.

DESCRIPTION OF EMBODIMENTS

First Embodiment

Figure 1:
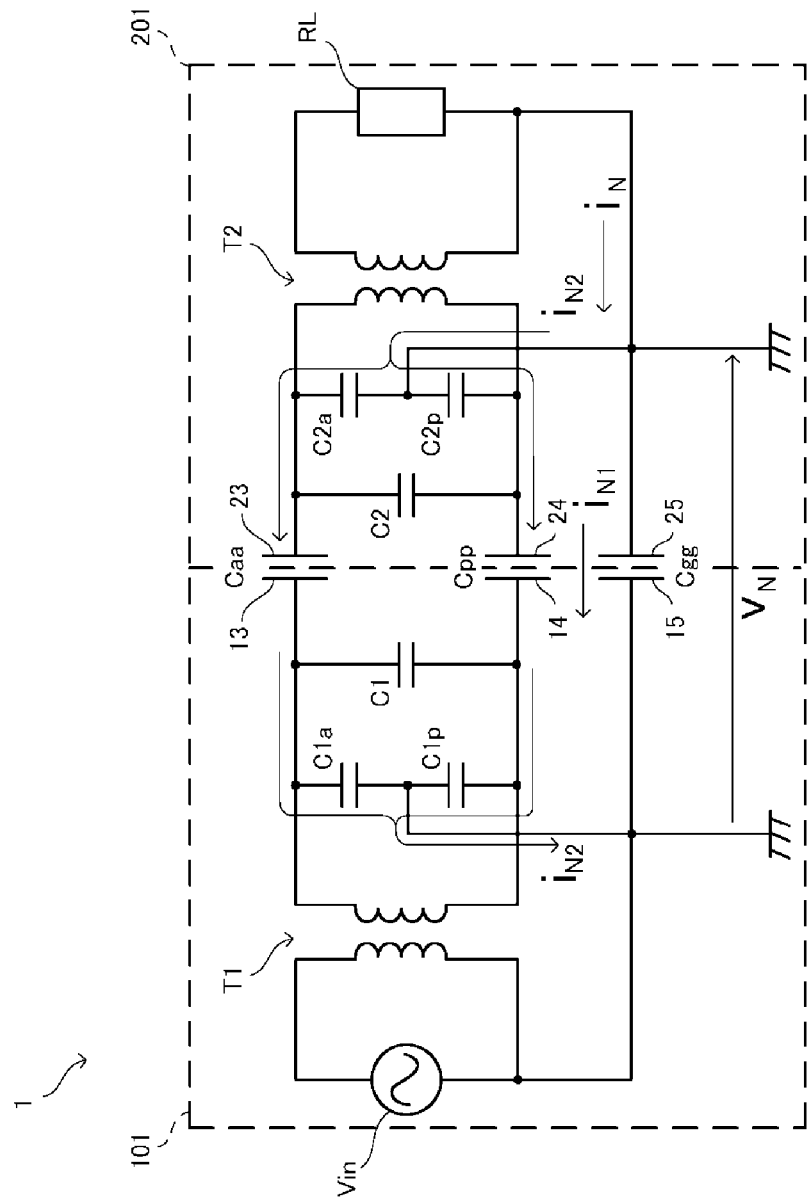
FIG. 1 is a circuit diagram illustrating a circuit of a power transmission system according to a first embodiment.

FIG. 1 is a diagram illustrating a circuit of a power transmission system 1 according to a first embodiment. The power transmission system 1 in the present embodiment is configured by a power transmitting device 101 and a power receiving device 201. The power receiving device 201 is placed on the power transmitting device 101. The power transmitting device 101 transmits electric power to the power receiving device 201 placed thereon (i.e., placed in operative engagement wherein power can be transmitted from the power transmitting device 101 to the power receiving device 201).

The power receiving device 201 includes a load circuit RL. The load circuit RL can be a secondary battery, a charging circuit, and the like. The power receiving device 201 is typically a portable electronic device such as a cellular phone, a personal digital assistant (PDA), a portable music player, a notebook-type personal computer (PC), and a digital camera. The power receiving device 201 charges the secondary battery with the electric power transmitted from the power transmitting device 101.

Although in FIG. 1, the load circuit RL is provided in the power receiving device 201, it may be mounted on an external device capable of being attached to the power receiving device 201 detachably.

The power transmitting device 101 includes an alternating current (AC) power supply Vin. For example, the AC power supply Vin converts a direct-current (DC) voltage that is output from an AC adapter connected to a commercial power supply into an AC voltage by an inverter circuit, and outputs it.

A primary coil of a step-up transformer T1 is connected to the AC power supply Vin. A secondary coil of the step-up transformer T1 is connected to an active electrode 13 and a passive electrode 14. The step-up transformer T1 steps up the AC voltage output from the AC power supply Vin and applies it to the active electrode 13 and the passive electrode 14.

A capacitor C1 is connected in parallel to the secondary coil of the step-up transformer T1. The capacitor C1 forms a series resonance circuit together with leakage inductance (not illustrated) of the secondary coil of the step-up transformer T1. It should be noted that the series resonance circuit may be configured by leakage inductance of the step-up transformer T1 and/or by an inductor as an actual component. Further, the secondary coil of the step-up transformer T1 and the capacitor C1 may be configured as parallel resonance circuit.

The power transmitting device 101 includes a reference potential electrode 15 which is connected to a reference potential of the power transmitting device 101. The reference potential electrode 15 is connected to the active electrode 13 with a capacitor C1$a$ interposed there between. Further, the reference potential electrode 15 is connected to the passive electrode 14 with a capacitor C1$p$ interposed there between.

The capacitor C1$a$ is an example of a "transmitting side first capacitor" according to the present invention and the capacitor C1$p$ is an example of a "transmitting side second capacitor" according to the present invention.

The active electrode 13 is an example of a "transmitting side first electrode" according to the present invention and the passive electrode 14 is an example of a "transmitting side second electrode" according to the present invention. The reference potential electrode 15 is an example of a "transmitting side reference electrode" according to the present invention.

The power receiving device 201 includes an active electrode 23, a passive electrode 24, and a reference potential electrode 25. When the power receiving device 201 is placed in operative engagement with the power transmitting device 101, the active electrode 23 opposes the active electrode 13 of the power transmitting device 101 with a gap there between so as to form a capacitor Caa. The passive electrode 24 opposes the passive electrode 14 of the power transmitting device 101 with a gap there between so as to form a capacitor Cpp. The opposing active electrodes 13 and 23 and the opposing passive electrodes 14 and 24 make capacitance coupling (electric field coupling). The capacitance coupling allows an AC signal to be transmitted between the transmitting side and the receiving side, so that electric power is transmitted to the power receiving device 201 from the power transmitting device 101. This enables power transmission even in a state where the electrodes of the power receiving device 201 and the electrodes of the power transmitting device 101 do not make physical contact with one another.

Further, the reference potential electrode 25 opposes the reference potential electrode 15 of the power transmitting device 101 with a gap there between so as to form a capacitor Cgg. The reference potential electrode 25 is connected to a reference potential of the power receiving device 201. Accordingly, the reference potential of the power receiving device 201 is connected to the reference potential (for example, ground) of the power transmitting device 101 with the capacitor Cgg interposed there between.

The reference potential electrode 25 is connected to the active electrode 23 with a capacitor C2$a$ interposed there between. Further, the reference potential electrode 25 is connected to the passive electrode 24 with a capacitor C2$p$ interposed there between. The capacitor C2$a$ is an example of a "receiving-side first capacitor" according to the present invention and the capacitor C2$p$ is an example of a "receiving-side second capacitor" according to the present invention.

The values of the above-mentioned capacitors are defined so as to satisfy the following relationship: Caa:Cpp≈C1$a$:C1$p$≈C2$a$:C2$p$. With this, even when a high voltage is applied to between the active electrode 13 and the passive electrode 14, fluctuation of the reference potentials of both the power transmitting device 101 and the power receiving device 201 is suppressed.

The active electrode 23 is an example of a "receiving side first electrode" according to the present invention and the passive electrode 24 is an example of a "receiving side second electrode" according to the present invention. The reference potential electrode 25 is an example of a "receiving side reference electrode" according to the present invention.

A primary coil of a step-down transformer T2 is connected to the active electrode 23 and the passive electrode 24 of the power receiving device 201. A capacitor C2 is connected in parallel to the primary coil of the step-down transformer T2. The primary coil of the step-down transformer T2 and the capacitor C2 form a parallel resonance circuit.

A constant is set for a resonance frequency of the parallel resonance circuit of the power receiving device 201 such that the resonance frequency is substantially identical to a resonance frequency of the series resonance circuit formed in the power transmitting device 101 side. When the power receiving device 201 is placed in operative engagement with the power transmitting device 101, the series resonance circuit and the parallel resonance circuit make coupling resonance (combined resonance). Further, a driving frequency in the power transmission to the power receiving device 201 from the power transmitting device 101 is set to the resonant frequency of the series resonance circuit and the parallel resonance circuit which have substantially the same resonant frequencies. The power transmission to the power receiving device 201 from the power transmitting device 101 is performed at the driving frequency. Accordingly, efficient power transmission can be achieved.

A load circuit RL is connected to the secondary coil of the step-down transformer T2. The load circuit RL includes a rectifying smoothing circuit (not shown), a DC-to-DC converter, and the like in addition to the secondary battery and the charging circuit as described above. The rectifying smoothing circuit can be configured by a diode bridge formed by four diodes, a capacitor, and an inductor. The load circuit RL rectifies and smoothes the AC voltage stepped down by the step-down transformer T2, and then, converts it into a stabilized predetermined voltage so as to charge the secondary battery.

The power receiving device 201 often includes a touch panel and the reference potential of the power receiving device 201 sometimes fluctuates when the touch panel is operated during the power transmission to the power receiving device 201 from the power transmitting device 101. In this case, the touch panel may not operate normally.

Such a problem can easily occur when the power receiving device 201 is a small, portable device. That is to say, the reference potential cannot be connected to the external earth in the portable device. As a result, and in order to stabilize the reference potential, the sizes of a shield case, a ground electrode on a circuit substrate, and the like provided as a housing or in a housing are typically increased as large as possible so as to increase a conductor configuring the reference potential of the device in size, so that operations of a circuit are stabilized. However, in the case of a small-sized portable wireless terminal or the like, the housing is small and the shield case and the ground electrode on the circuit substrate are also reduced in size. For this reason, it is not possible to increase the size sufficiently to ensure that the reference potential is stable. Therefore, when transmission of electric power larger than communication is performed, the reference potential tends to easily fluctuate. On the other hand, it is easier to stabilize the reference potential of the power transmitting device 101 side rather than that of the power receiving device 201 by making the housing in the power transmitting device 101 relatively large, connecting it to a ground terminal of a plug with the AC adapter interposed there between, etc.

In order to stabilize the reference potential of the power receiving device, the power transmission system 1 in the present embodiment includes the reference potential electrodes 15 and 25 and connects the reference potential of the power receiving device 201 to the reference potential of the power transmitting device 101 with the capacitor Cgg interposed there between. In addition to the shield case and the ground electrode on the circuit substrate that configure the reference potential in the power receiving device 201 side, a shield electrode and a ground electrode on a circuit substrate in the power transmitting device 101, which are connected thereto with the capacitor Cgg interposed there between, also play a function of increasing the effective size of the conductor of the reference potential. As a result, the reference potential of the power receiving device 201 is further stabilized when the power transmitting device 101 is operatively coupled to the power receiving device 20 with the capacitor Cgg interposed there between and the occurrence of the failures can be prevented during power transmission.

Hereinafter, a reason why the fluctuation of the reference potential of the power receiving device 201 can be suppressed by providing the reference potential electrodes 15 and 25 will be described in more detail.

Potential difference between the reference potential of the power transmitting device 101 and the reference potential of the power receiving device 201 is expressed as vN. The reference potential of the power receiving device 201 is connected to the reference potential of the power transmitting device 101 with the capacitor Cgg interposed there between. Accordingly, when the reference potential vN is small, the reference potential of the power receiving device 201 is closer to the reference potential of the power transmitting device 101, so that the reference potential of the power receiving device 201 is stabilized.

When the reference potential of the power receiving device 201 fluctuates, noise current iN is generated. The noise current iN flows through the capacitor Cgg, a first path having the capacitors C1a, Caa, and C2a, and a second path having the capacitors C1p, Cpp, and C2p as indicated by arrows in FIG. 1. iN1 as indicated in FIG. 1 expresses noise current flowing through the capacitor Cgg and iN2 expresses noise current flowing through an integrated capacitor Cint. Cint expresses the integrated capacitor of the first path and the second path.

Figure 2A:
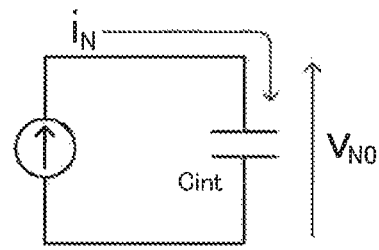
FIGS. 2(A) and 2(B) are circuit diagrams for explaining a reason why a reference potential of a power receiving device is stabilized by providing reference potential electrodes.
Figure 2B:
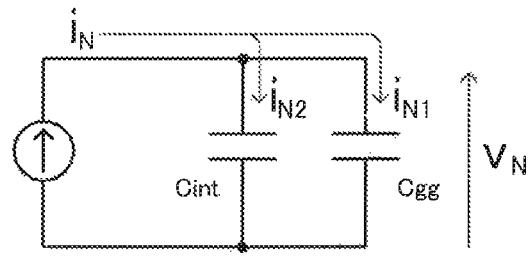

FIGS. 2(A) and 2(B) are circuit diagrams for explaining the reason why the reference potential of the power receiving device 201 is stabilized by providing the reference potential electrodes 15 and 25. FIG. 2(A) illustrates a circuit when the reference potential electrodes 15 and 25 are not provided and FIG. 2(B) illustrates a circuit when the reference potential electrodes 15 and 25 are provided.

When the reference potential electrodes 15 and 25 are not provided as illustrated in FIG. 2(A), the noise current iN is applied to only the capacitor Cint. In this case, when a voltage that is applied to the capacitor Cint is expressed by vN0, the following equation is established:

$$iN = j\omega C\text{int} \cdot vN0 \quad (1)$$

The voltage vN0 indicates the reference potential of the power receiving device 201 when the reference potential of the power transmitting device 101 is set to a reference in the case where the reference potential electrodes 15 and 25 are not provided. Cint is capacitance of the integrated capacitor Cint.

When the reference potential electrodes 15 and 25 are provided as illustrated in FIG. 2(B), a voltage that is applied to the capacitor Cgg is vN and the voltage vN can be expressed by the following equation.

$$vN = iN/j\omega(C\text{int} + Cgg) \quad (2)$$

Based on the equation (1) and the equation (2), the voltage vN can be expressed by the following equation.

$$vN = C\text{int} \cdot vN0/(C\text{int} + Cgg) \quad (3)$$

As is seen from the equation (3), the voltage vN when the reference potential electrodes 15 and 25 are provided is lower than the voltage vN0 when the reference potential electrodes 15 and 25 are not provided for a shunted amount. Accordingly, when the reference potential electrodes 15 and 25 are provided, the reference potential of the power receiving device 201 is more stable than that when the reference potential electrodes 15 and 25 are not provided.

Further, when Cint<Cgg is set in the equation (3), the voltage vN is lower than the half of the voltage vN0. Accordingly, the reference potential of the power receiving device 201 can be further stabilized by providing the reference potential electrodes 15 and 25 and designing the power transmission system 1 such that the condition of Cint<Cgg is satisfied.

Figure 3:
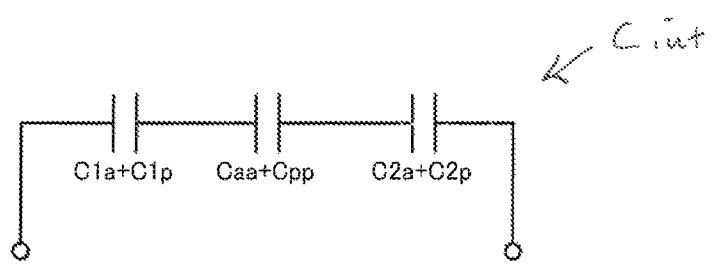
FIG. 3 illustrates an equivalent circuit of an integrated capacitor.

As described above, the values of the capacitors are defined so as to satisfy Caa:Cpp≈C1a:C1p≈C2a:C2p. Therefore, the integrated capacitor Cint can be considered as a circuit as illustrated in FIG. 3. FIG. 3 is an equivalent circuit of the integrated capacitor Cint. The integrated capacitor Cint can be considered as a circuit in which a parallel circuit of the capacitors C1a and C1p (hereinafter, referred to as capacitors C1a+C1p), a parallel circuit of the capacitors Caa and Cpp (hereinafter, referred to as capacitors Caa+Cpp), and a parallel circuit of the capacitors C2a and C2p (hereinafter, referred to as capacitors C2a+C2p) are connected in series.

The capacitances of the capacitors C1a, C1p, C2a, and C2p are expressed by C1a, C1p, C2a, and C2p, respectively. The capacitance of the capacitor Caa formed by making the active electrodes 13 and 23 oppose each other is expressed by Caa and the capacitance of the capacitor Cpp formed by making the passive electrodes 14 and 24 oppose each other is expressed by Cpp.

In this case, when any one or more of the capacitors C1a+C1p, C2a+C2p, and Caa+Cpp are smaller than Cgg, the condition of Cint<Cgg is satisfied. Accordingly, the condition of Cint<Cgg is established by satisfying any one or more of C1a+C1p<Cgg, C2a+C2p<Cgg, and Caa+Cpp<Cgg, thereby further stabilizing the reference potential of the power receiving device 201.

Hereinafter, a method of measuring the capacitance of the respective capacitors will be described.

Figure 4:
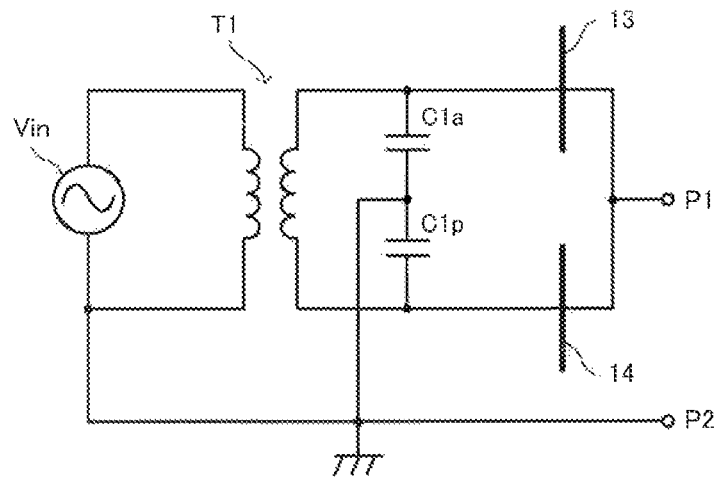
FIG. 4 is a circuit diagram for explaining a method of measuring capacitance of capacitors $C1a+C1p$.

FIG. 4 is a diagram for explaining a method of measuring the capacitance of the capacitors C1a+C1p. When the capacitance of the capacitors C1a+C1p is measured, the active electrode 13 and the passive electrode 14 are short-circuited. Then, the capacitance between the short-circuit portion and the reference potential (between terminals P1 and P2 as illustrated in FIG. 4) is measured.

Figure 5:
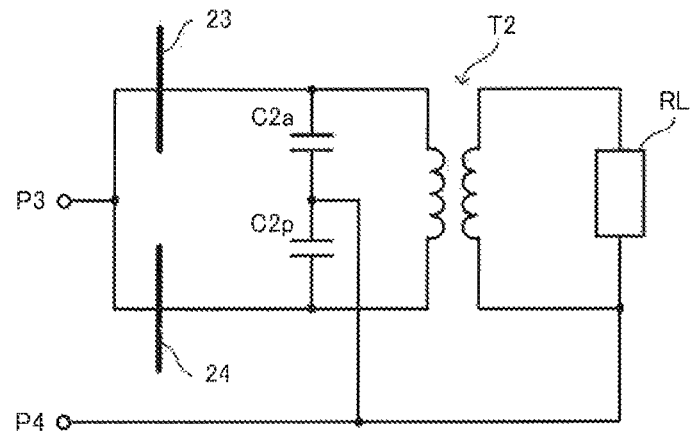
FIG. 5 is a circuit diagram for explaining a method of measuring capacitance of capacitors $C2a+C2p$.

FIG. 5 is a diagram for explaining a method of measuring the capacitance of the capacitors C2a+C2p. When the capacitance of the capacitors C2a+C2p is measured, the active electrode 23 and the passive electrode 24 are short-circuited. Then, the capacitance between the short-circuit portion and the reference potential (between terminals P3 and P4 as illustrated in FIG. 5) is measured.

Figure 6:
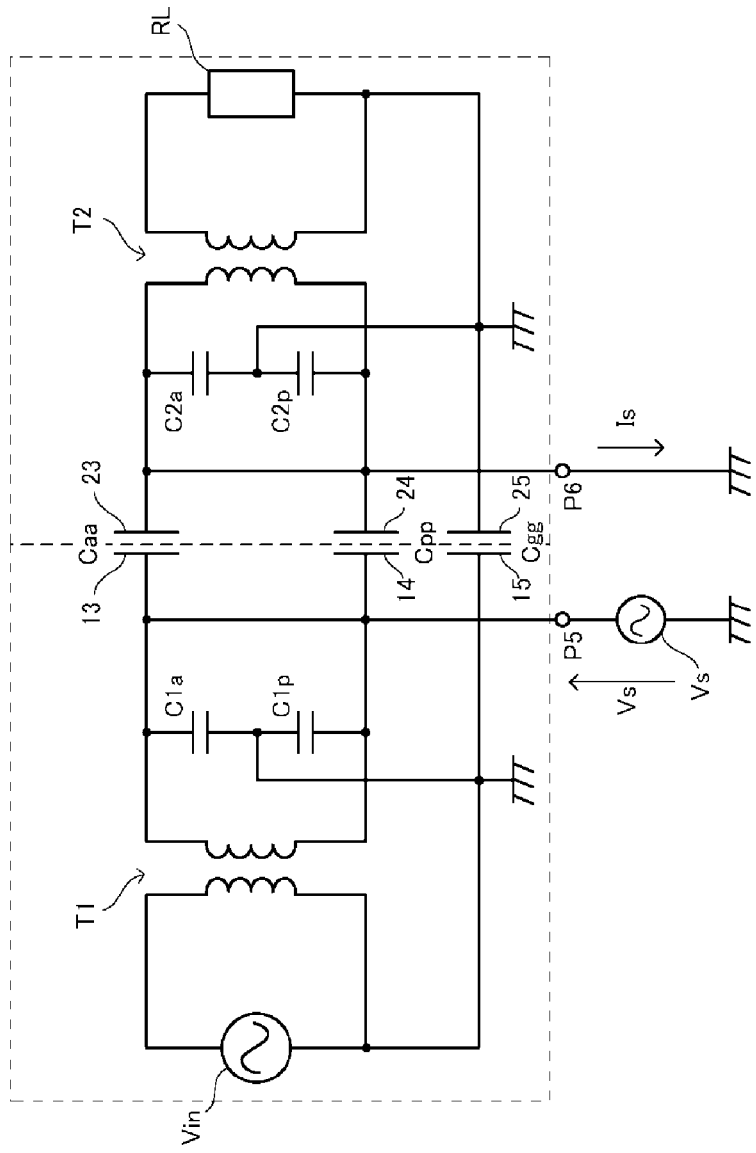
FIG. 6 is a circuit diagram for explaining a method of measuring capacitance of capacitors Caa+Cpp.

FIG. 6 is a diagram for explaining a method of measuring the capacitance of the capacitors Caa+Cpp. When the capacitance of the capacitors Caa+Cpp is measured, the active electrode 13 and the passive electrode 14 of the power transmitting device 101 are short-circuited and connected to a constant voltage source Vs. Further, the active electrode 23 and the passive electrode 24 of the power receiving device 201 are short-circuited and connected to the ground. In addition, the reference potentials of the power transmitting device 101 and the power receiving device 201 are connected to the ground in order to remove influences by the reference potential electrodes 15 and 25.

Then, when a voltage is output from the constant voltage source Vs, an electric current flowing to the ground after passing through the capacitors Caa and Cpp from the constant voltage source Vs is detected. When the output voltage of the constant voltage source Vs is expressed by Vs and the current that is detected is expressed by Is, the capacitance (Caa+Cpp) of the capacitors Caa+Cpp can be calculated from the following equation.

$$(Caa+Cpp)=Is/2\pi fVs \quad (4)$$

Figure 7:
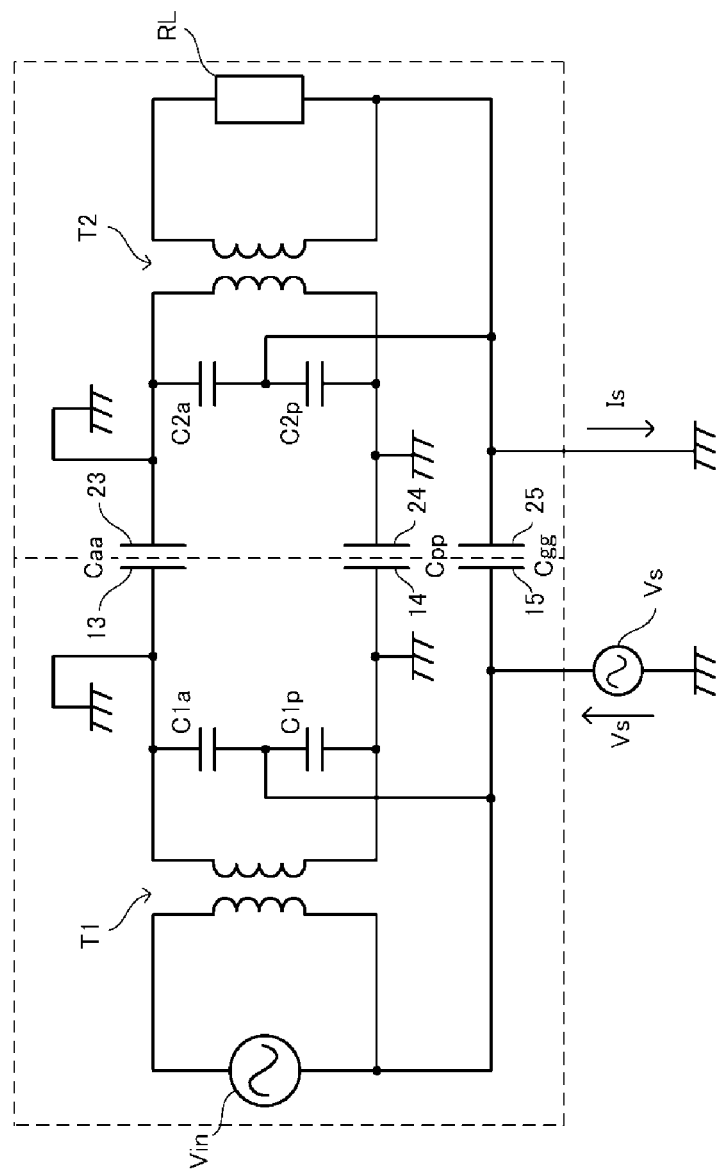
FIG. 7 is a circuit diagram for explaining a method of measuring capacitance of a capacitor Cgg.

FIG. 7 is a diagram for explaining a method of measuring the capacitance of the capacitor Cgg. When the capacitance of the capacitor Cgg is measured, each of the active electrode 13 and the passive electrode 14 of the power transmitting device 101 and the active electrode 23 and the passive electrode 24 of the power receiving device 201 is connected to the ground. Further, the reference potential electrode 15 is connected to the constant voltage source Vs and the reference potential electrode 25 is connected to the ground.

Then, when a voltage is output from the constant voltage source Vs, a current Is flowing through the capacitor Cgg is detected and the capacitance of the capacitor Cgg can be calculated from the following equation.

$$Cgg=Is/2\pi fVs \quad (5)$$

The respective capacitances of the capacitors C1a+C1p, Caa+Cpp, C2a+C2p, and Cgg can be measured as described above. The power transmitting device 101 and the power receiving device 201 are designed so as to satisfy any one or more of the conditions of C1a+C1p<Cgg, C2a+C2p<Cgg, and Caa+Cpp<Cgg. In this case, the above-described condition may be satisfied by changing elements of the capacitors C1a and C1p or the capacitors C2a and C2p. Furthermore, the above described condition may be satisfied by adjusting the sizes of the active electrodes 13 and 23, the passive electrodes 14 and 24, or the reference potential electrodes 15 and 25 or distances between the electrodes.

Figure 8:
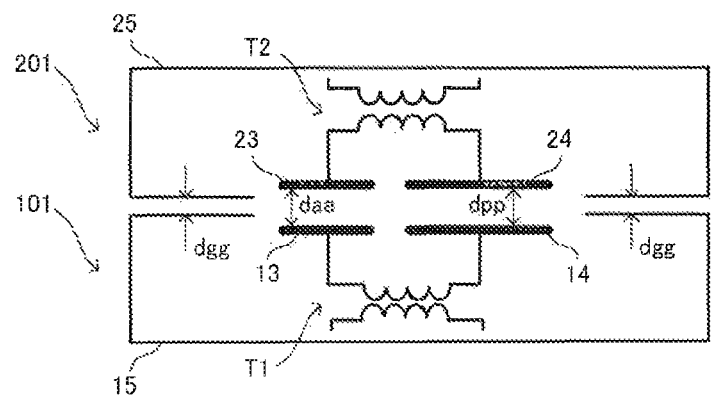
FIG. 8 is a circuit diagram illustrating an example of an electrode structure when capacitance is adjusted.
Figure 9:
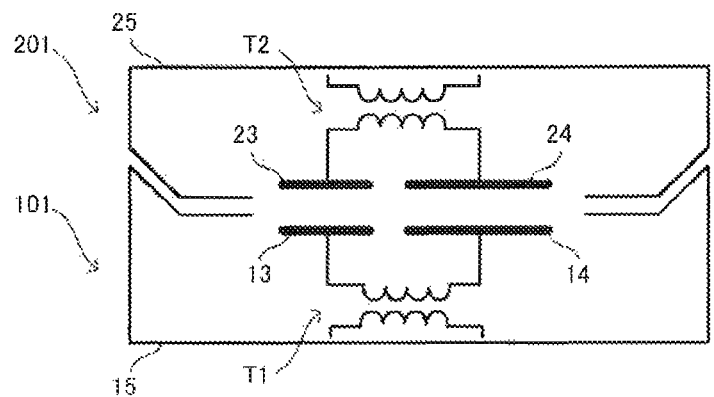
FIG. 9 is a circuit diagram illustrating another example of the electrode structure when the capacitance is adjusted.

FIG. 8 and FIG. 9 are diagrams illustrating examples of an electrode structure when the capacitance is adjusted. In FIG. 8 and FIG. 9, illustration of circuits other than the step-up transformer T1 and the step-down transformer T2 is omitted.

In the example as illustrated in FIG. 8, the reference potential electrode 15 is provided so as to surround the circuit including the active electrode 13, the passive electrode 14, the step-up transformer T1, and the like in the power transmitting device 101. In the same manner, the reference potential electrode 25 is provided so as to surround the circuit including the active electrode 23, the passive electrode 24, the step-down transformer T2, and the like in the power receiving device 201. Noise from high-voltage portions can be shielded by surrounding the high-voltage portions such as the active electrodes 13 and 23 by the reference potential electrodes 15 and 25.

When the power receiving device 201 is operatively connected to power transmitting device 101, the active electrodes 13 and 23 oppose each other and the passive electrodes 14 and 24 oppose each other. Further, at least parts of the reference potential electrodes 15 and 25 oppose each other. In this case, the individual electrodes are configured such that a distance dgg between the opposing reference potential electrodes 15 and 25 is smaller than a distance daa between the active electrodes 13 and 23 and a distance dpp between the passive electrodes 14 and 24. When the distance between the electrodes of a given capacitor is small, the capacitance of the capacitor is large. Therefore, adjustment is easy to be made so as to establish a relation of Caa+Cpp<Cgg.

In the example as illustrated in FIG. 9, the reference potential electrode 15 of the power transmitting device 101 is provided so as to surround the circuit including the active electrode 13, the passive electrode 14, the step-up transformer T1, and the like in the same manner as FIG. 8. Further, the reference potential electrode 25 of the power receiving device 201 is provided so as to surround the circuit including the active electrode 23, the passive electrode 24, the step-down transformer T2, and the like. The reference potential electrodes 15 and 25 are bent such that the area of the opposing portions thereof is increased. With this, the opposing area can be increased by bending the opposing surfaces in comparison with the case where the opposing surfaces are not bent.

The opposing area of the reference potential electrodes 15 and 25 is larger than the opposing area of the active electrodes 13 and 23 and the opposing area of the passive electrodes 14 and 24. When the opposing area of the electrodes is larger, the capacitance of the capacitor is larger. Accordingly, adjustment is easy to be made so as to establish the relation of Caa+Cpp<Cgg.

In the case of the configuration as illustrated in FIG. 9, the reference potential electrodes 15 and 25 are bent into complementary shapes. With this, when the power receiving device 201 is placed on the power transmitting device 101, a placement position of the power receiving device 201 on the power transmitting device 101 is easy to be determined.

Further, the capacitance of the capacitor Caa or Cpp may be made small so as to establish the relation of Caa+Cpp<Cgg by providing a low-dielectric constant layer such as an air gap between the active electrodes 13 and 23 or between the passive electrodes 14 and 24.

In the examples illustrated in FIG. 8 and FIG. 9, when the power transmitting device 101 and the power receiving device 201 have metallic housings, the housings may be used as the reference potential electrodes 15 and 25. Further, the capacitance between the reference potential electrodes 15 and 25 may be increased by forming an insulating structure with a metal oxide film as surface processing on the metal housings.

Figure 10:
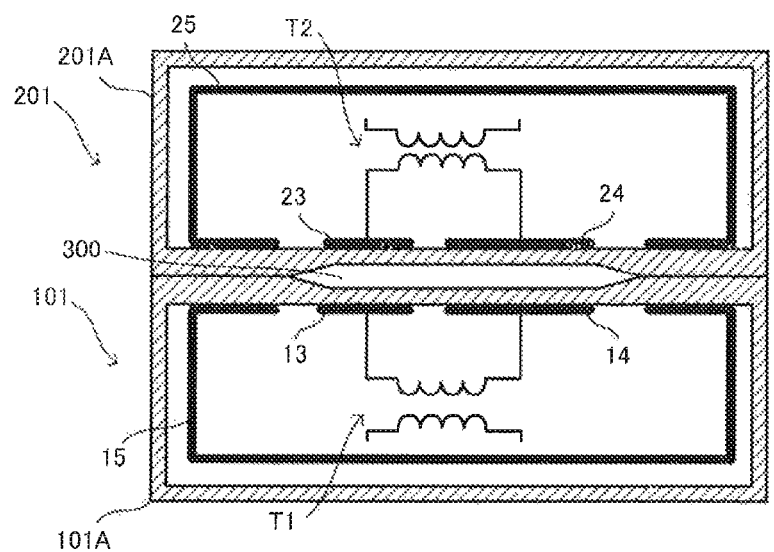
FIG. 10 is a circuit diagram illustrating an example of a structure when low dielectric constant layers are provided between active electrodes and between passive electrodes.

FIG. 10 is a diagram illustrating an example of a structure wherein low-dielectric constant layers are provided between both the active electrodes 13 and 23 and the passive electrodes 14 and 24.

In the example illustrated in FIG. 10, a resin housing 101A of the power transmitting device 101 has a shape with a recess over opposing portions of the active electrode 13 and the passive electrode 14. The active electrode 13, the passive electrode 14, and a part of the reference potential electrode 15 are provided along the inner wall surface of the resin housing 101A. Further, a resin housing 201A of the power receiving device 201 has a shape with a recess over opposing portions of the active electrode 23 and the passive electrode 24. The active electrode 23, the passive electrode 24, and a part of the reference potential electrode 25 are provided along the inner wall surface of the resin housing 201A.

When the power receiving device 201 is placed on (in operative engagement with) the power transmitting device 101, the active electrodes 13 and 23, the passive electrodes 14 and 24, and parts of the reference potential electrodes 15 and 25 oppose each other. In this case the recesses of the resin housings 101A and 201A define an air gap 300 between the active electrodes 13 and 23 and the passive electrodes 14 and 24, respectively. In contrast, no air gap 300 is formed between the reference potential electrodes 15 and 25. As a result, the relations of Caa<Cgg and Cpp<Cgg are established, so that the relation of Caa+Cpp<Cgg is established.

It is sufficient that any one or more of the conditions of C1a+C1p<Cgg, C2a+C2p<Cgg, and Caa+Cpp<Cgg are satisfied in order to stabilize the reference potential of the power receiving device 201. However, when the power transmitting device 101 and the power receiving device 201 are designed such that the condition of C1a+C1p<Cgg or C2a+C2p<Cgg is satisfied, the reference potential can be stabilized while ensuring the capacitances between the active electrodes and between the passive electrodes and enhancing the transmission power and power transmission efficiency. In some cases it is necessary to reduce the thickness of the power receiving device 201. As for this, the degree of freedom of the design of the power receiving device 201 can be improved by designing the power transmitting device 101 so as to satisfy the condition of C1a+C1p<Cgg.

Second Embodiment

Figure 11:
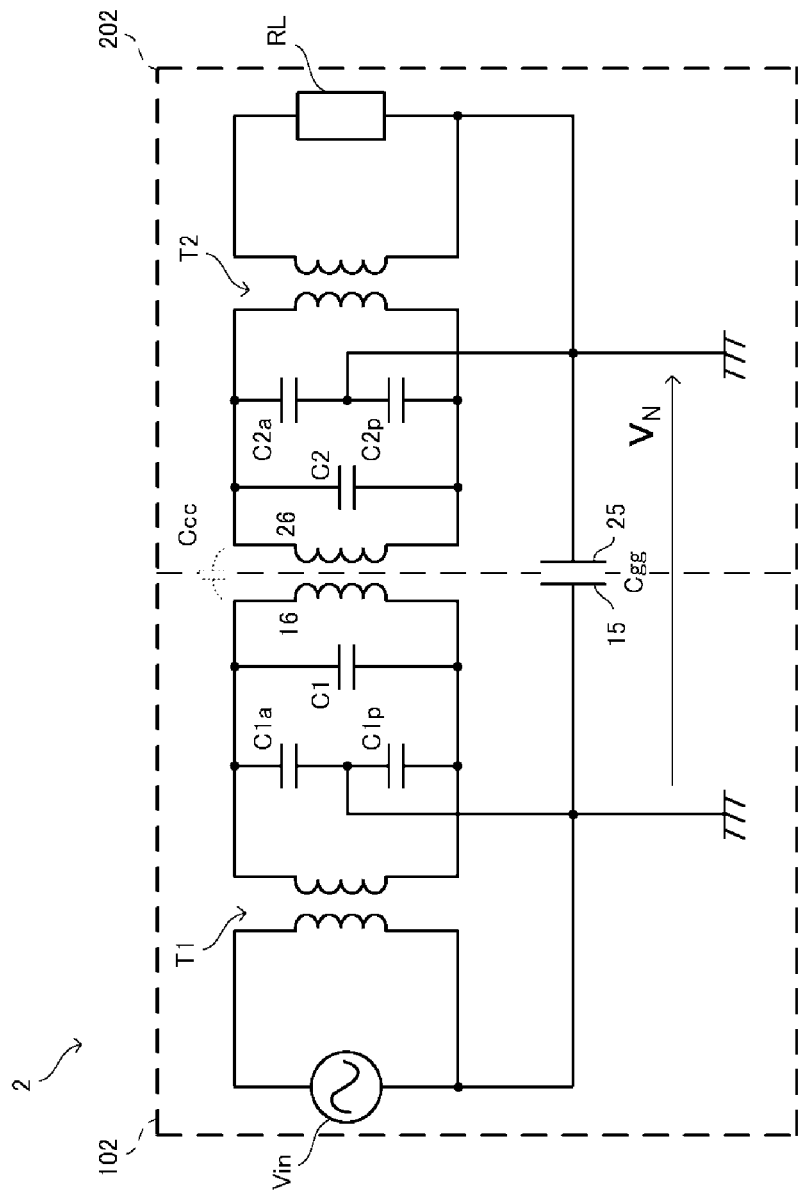
FIG. 11 is a circuit diagram illustrating a circuit of a power transmission system according to a second embodiment.

FIG. 11 is a diagram illustrating a circuit of a power transmission system according to a second embodiment. In the first embodiment, electric power is transmitted to the power receiving device from the power transmitting device by the electric field coupling method. In the present embodiment, electric power is transmitted to the power receiving device from the power transmitting device by magnetic field coupling.

In this example, in a power transmitting device 102, a transmitting-side coil 16 is connected to the secondary coil of the step-up transformer T1 instead of the active electrode and the passive electrode. Further, in a power receiving device 202, a receiving-side coil 26 is connected to the primary coil of the step-down transformer T2 instead of the active electrode and the passive electrode. It should be noted that other configurations are the same as those in the first embodiment.

When the power receiving device 202 is placed in operative engagement with the power transmitting device 102, the transmitting-side coil 16 and the receiving-side coil 26 oppose each other so as to create a magnetic field coupling. With the magnetic field coupling, electric power is transmitted to the power receiving device 202 from the power transmitting device 102.

The transmitting-side coil 16 and the receiving-side coil 26 oppose each other so as to form a capacitor Ccc between the coils. The capacitor Ccc corresponds to the capacitors Caa+Cpp as described in the first embodiment. Accordingly, the power transmitting device 102 and the power receiving device 202 are designed so as to satisfy any one or more of the conditions of C1a+C1p<Cgg, C2a+C2p<Cgg, and Ccc<Cgg. With this, as described in the first embodiment, fluctuation of the reference potential of the power receiving device 202 can be suppressed.

Figure 12:
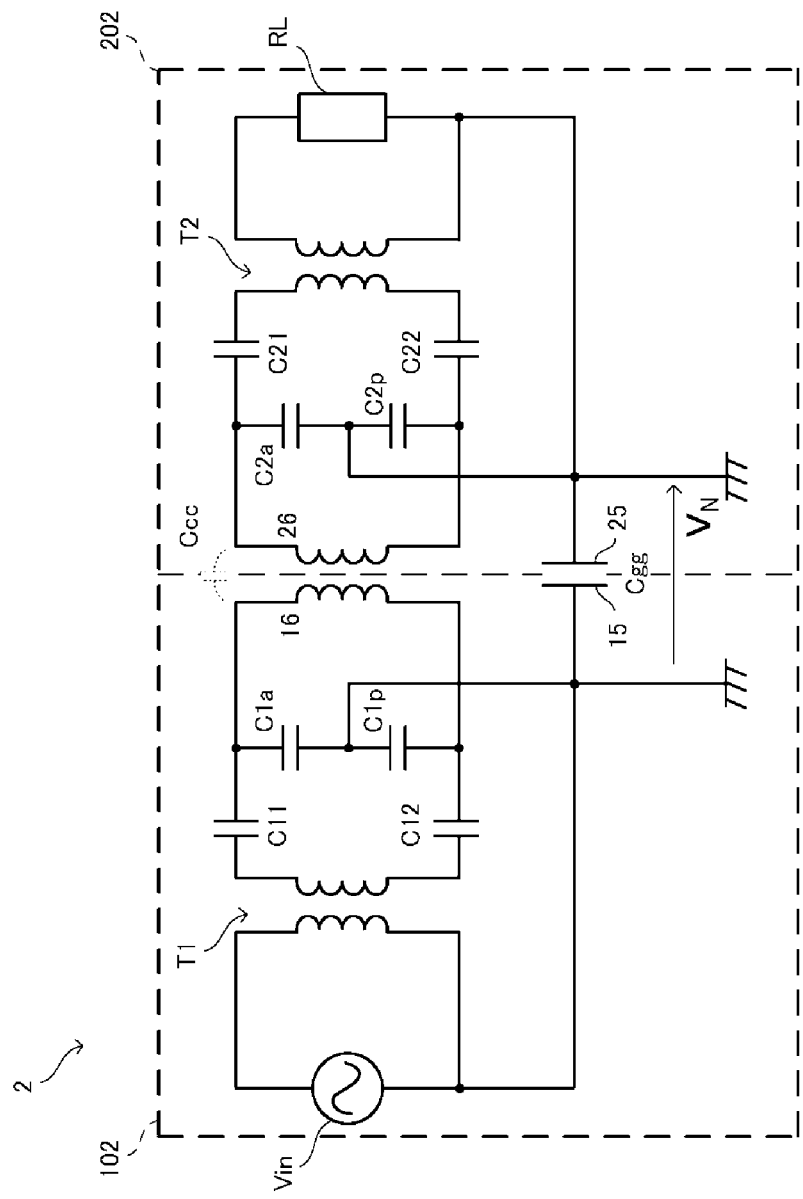
FIG. 12 is a circuit diagram illustrating another example of the circuit of the power transmission system according to the second embodiment.

FIG. 12 is a diagram illustrating another example of the circuit of the power transmission system in the second embodiment. In this example, capacitors C1 and C2 as illustrated in FIG. 11 are not provided, capacitors C11 and C12 are connected to opposite ends of the secondary coil of the step-up transformer T1, and capacitors C21 and C22 are connected to opposite ends of the primary coil of the step-down transformer T2. All of the capacitors C11, C12, C21, and C22 are resonance capacitors like the capacitors C1 and C2. This circuit configuration can also suppress the fluctuation of the reference potential of the power receiving device 202 by satisfying the above-described condition.

In the same manner as the first embodiment, it is sufficient that any one or more of the conditions of C1a+C1p<Cgg, C2a+C2p<Cgg, and Ccc<Cgg are satisfied in order to stabilize the reference potential of the power receiving device 202. However, by making design so as to satisfy the condition of C1a+C1p<Cgg or C2a+C2p<Cgg, it is not necessary to change the number of windings of the coils of the transmitting-side coil 16 and the receiving-side coil 26 or the like. In this case, the risk that the transmission power efficiency is influenced can be avoided by changing the number of windings of the coils of the transmitting-side coil 16 and the receiving-side coil 26, or the like. In some cases it is necessary to reduce the thickness of the power receiving device 202. As for this, the degree of freedom of the design of the power receiving device 202 can be improved by designing the power transmitting device 102 so as to satisfy the condition of C1a+C1p<Cgg.

In addition, the step-up transformer T1 and/or the step-down transformer T2 as illustrated in FIG. 11 and FIG. 12 may be omitted. That is to say, when a signal source (for example, AC power supply Vin) can output a necessary voltage to the transmitting-side resonance circuit, the signal source is preferably connected to the transmitting-side resonance circuit directly. Moreover, when the output of the receiving-side resonance circuit can output a corresponding voltage to the load, the receiving-side resonance circuit is preferably connected to the load directly.

REFERENCE SIGNS LIST

13 ACTIVE ELECTRODE (TRANSMITTING-SIDE FIRST ELECTRODE)

14 PASSIVE ELECTRODE (TRANSMITTING-SIDE SECOND ELECTRODE)
15 REFERENCE POTENTIAL ELECTRODE (TRANSMITTING-SIDE REFERENCE ELECTRODE)
16 TRANSMITTING-SIDE COIL
23 ACTIVE ELECTRODE (RECEIVING-SIDE FIRST ELECTRODE)
24 PASSIVE ELECTRODE (RECEIVING-SIDE SECOND ELECTRODE)
25 REFERENCE POTENTIAL ELECTRODE (RECEIVING-SIDE REFERENCE ELECTRODE)
26 RECEIVING-SIDE COIL
101, 102 POWER TRANSMITTING DEVICE
201, 202 POWER RECEIVING DEVICE
101A, 201A RESIN HOUSING
300 AIR GAP
C1, C2 CAPACITOR
C1$a$ CAPACITOR (TRANSMITTING-SIDE FIRST CAPACITOR)
C1$p$ CAPACITOR (TRANSMITTING-SIDE SECOND CAPACITOR)
C2$a$ CAPACITOR (RECEIVING-SIDE FIRST CAPACITOR)
C2$p$ CAPACITOR (RECEIVING-SIDE SECOND CAPACITOR)
Caa, Cpp, Cgg, Ccc CAPACITOR
Cint INTEGRATED CAPACITOR
daa, dgg, dpp DISTANCE
P1, P2, P3, P4, P5, P6 TERMINAL
RL LOAD CIRCUIT
T1 STEP-UP TRANSFORMER
T2 STEP-DOWN TRANSFORMER
Vin AC POWER SUPPLY

The invention claimed is:

1. A power transmission system comprising: (a) a power transmitting device including:
   (i) transmitting side first and second electrodes which receive an alternating current voltage;
   (ii) a transmitting side reference electrode connected to a first reference potential;
   (iii) a transmitting side first capacitor having a capacitance C1$a$ connected between the transmitting side reference electrode and the transmitting side first electrode; and
   (iv) a transmitting side second capacitor having a capacitance C1$p$ connected between the transmitting side reference electrode and the transmitting side second electrode; and (b) a power receiving device including:
   (i) a receiving side first and second electrodes;
   (ii) a receiving side reference electrode connected to a second reference potential;
   (iii) a receiving side first capacitor having a capacitance C2$a$ connected between the receiving side reference electrode and the receiving side first electrode; and
   (iv) a receiving side second capacitor having a capacitance C2$p$ connected between the receiving side reference electrode and the receiving side second electrode; and
   when the power transmitting device is placed in operative engagement with the power receiving device so that
   (i) the transmitting side first electrode opposes the receiving side first electrode with a gap there between to form a capacitor having a capacitance Caa,
   (ii) the transmitting side second electrode opposes the receiving side second electrode with a gap there between to form a capacitor having a capacitance Cpp; and
   (iii) the transmitting side reference electrode opposes the receiving side reference electrode with a gap to form a capacitor having a capacitance Cgg, at least one of the following relationships is met: Caa+Cpp<Cgg, C1$a$+C1$p$<Cgg, and C2$a$+C2$p$<Cgg.

2. The power transmission system of claim 1, wherein the condition C1$a$+C1$p$<Cgg or C2$a$+C2$p$<Cgg is satisfied.

3. The power transmission system according to claim 1, wherein the condition of C1$a$+C1$p$<Cgg is satisfied.

4. The power transmission system according to claim 1, wherein the power transmitting device and the power receiving device include respective metallic cases which form at least part of the transmitting and receiving side reference electrodes, respectively.

5. The power transmission system according to claim 1, wherein the power transmitting device comprises a housing including the transmitting side reference electrode and the power receiving device comprises a housing including the receiving side reference electrode and the transmitting side and receiving side reference electrodes are bent in a complimentary way so that the transmitting side reference electrode can nest into the receiving side reference electrode.

6. The power transmission system according to claim 1, wherein surface areas of the opposing transmitting and receiving side reference electrodes are greater than surface areas of the opposing transmitting side first electrode and the receiving side first electrode and surface areas of the opposing transmitting side second electrode and the receiving side second electrode.

7. The power transmission system according to claim 1, wherein the gap between the opposing transmitting side first electrode and the receiving side first electrode and the gap between the opposing transmitting side second electrode and the receiving side second electrode is larger than the gap between the opposing transmitting and receiving side reference electrodes.

8. The power transmission system according to claim 1, wherein the gap between the opposing transmitting side first electrode and the receiving side first electrode and the gap between the opposing transmitting side second electrode and the receiving side second electrode is filled with air and the gap between the opposing transmitting and receiving side reference electrodes is filled with resin.

9. The power transmission system according to claim 1, further comprising a step up transformer for applying the alternating current to the transmitting side first and second electrodes.

10. A power transmission system comprising: (a) a power transmitting device including:
   (i) a transmitting side coil which receives an alternating current voltage;
   (ii) a transmitting side reference electrode connected to a first reference potential;
   (iii) a transmitting side first capacitor having a capacitance C1$a$ connected between the transmitting side reference electrode and a first terminal of the transmitting side coil; and
   (iv) a transmitting side second capacitor having a capacitance C1$p$ connected between the transmitting side reference electrode and a second terminal of the transmitting side coil; and
   (b) a power receiving device including:
   (i) a receiving side coil;
   (ii) a receiving side reference electrode connected to a second reference potential;

(iii) a receiving side first capacitor having a capacitance $C2a$ connected between the receiving side reference electrode and a first terminal of the receiving side coil; and (iv) a receiving side second capacitor having a capacitance $C2p$ connected between the receiving side reference electrode and a second terminal of the receiving side coil; and when the power transmitting device is placed in operative engagement with the power receiving device so that (i) the transmitting side coil faces the receiving side coil with a gap there between to form a capacitor having a capacitance Caa and transmits a voltage induced by a magnetic field coupling to the receiving side coil (ii) the power transmitting side second electrode opposes the receiving side second electrode with a gap there between to form a capacitor having a capacitance Cpp; and (iii) the transmitting-side reference electrode opposes the receiving side reference electrode with a gap to form a capacitor having a capacitance Cgg, at least one of the following relationships is met: Caa+Cpp<Cgg, $C1a$+$C1p$<Cgg, and $C2a$+$C2p$<Cgg.

11. The power transmission system of claim 10, wherein the condition $C1a$+$C1p$<Cgg or $C2a$+$C2p$<Cgg is satisfied.

12. The power transmission system according to claim 11, wherein the condition of $C1a$+$C1p$<Cgg is satisfied.

* * * * *